United States Patent [19]

Sherman

[11] Patent Number: 5,014,940
[45] Date of Patent: May 14, 1991

[54] CLAMP ASSEMBLY

[75] Inventor: Clarence A. Sherman, Birmingham, Mich.

[73] Assignee: ZSI, Inc., Livonia, Mich.

[21] Appl. No.: 399,696

[22] Filed: Aug. 28, 1989

[51] Int. Cl.$^5$ .............................................. F16L 3/00
[52] U.S. Cl. ...................................... 248/74.1; 248/62
[58] Field of Search ...................... 248/74.1, 74.4, 62, 248/60, 55

[56] References Cited

U.S. PATENT DOCUMENTS

| 2,011,138 | 8/1935 | Austin . |
| 2,399,899 | 5/1946 | Tinnerman . |
| 2,440,469 | 4/1948 | Goddard . |
| 2,761,714 | 9/1956 | Cuskie .......................... 248/74.1 X |
| 2,872,141 | 2/1959 | Hefner . |
| 2,998,217 | 8/1961 | Englis et al. . |
| 3,203,653 | 8/1965 | Hall ...................................... 248/62 |
| 3,266,761 | 8/1966 | Walton et al. . |
| 3,286,963 | 11/1966 | Bergman ........................... 248/74.1 |
| 3,341,232 | 9/1967 | Deakins . |
| 3,370,815 | 2/1968 | Opperthauser . |
| 3,397,431 | 8/1968 | Walker . |
| 3,414,220 | 12/1968 | Walker . |
| 3,429,014 | 2/1969 | Roche . |
| 3,486,726 | 12/1969 | Kindorf et al. . |
| 3,553,793 | 1/1971 | Long et al. . |
| 3,606,218 | 9/1971 | Englund et al. . |
| 3,684,223 | 8/1972 | Logsdon . |
| 3,843,083 | 10/1974 | Angibaud . |
| 3,848,839 | 11/1974 | Tillman . |
| 4,037,810 | 7/1977 | Pate . |
| 4,143,844 | 3/1979 | Van Meter . |
| 4,185,802 | 1/1980 | Myles et al. . |
| 4,267,994 | 5/1981 | Lynch et al. .................. 248/74.1 X |
| 4,318,518 | 3/1982 | Davis . |
| 4,417,755 | 11/1983 | Gittleman . |
| 4,442,994 | 4/1984 | Logsdon . |
| 4,516,296 | 5/1985 | Sherman . |
| 4,612,680 | 9/1986 | Daiguji . |
| 4,614,321 | 9/1986 | Andre . |
| 4,640,479 | 2/1987 | Shely et al. . |
| 4,653,782 | 3/1987 | Munday . |
| 4,744,535 | 5/1988 | Patenaude ......................... 248/74.1 |

Primary Examiner—Carl D. Friedman
Assistant Examiner—Daniel Hulseberg
Attorney, Agent, or Firm—Harness, Dickey & Pierce

[57] ABSTRACT

A clamp assembly for securing elongate cylindrical members, such as pipe, tubing, conduit or hose, to a support surface. The clamp assembly comprises a split sleeve shock absorbing cushion and a U-shaped rod or bolt member. The cushion has an outer surface comprising a spaced pair of raised portions that form a saddle for the U-bolt rod member. When the U-bolt member is attached to the support surface the cushion is retainably engaged by the U-bolt and transmits the clamping force from the U-bolt across the full width of the inner surface of the cushion to the cylindrical member.

12 Claims, 2 Drawing Sheets

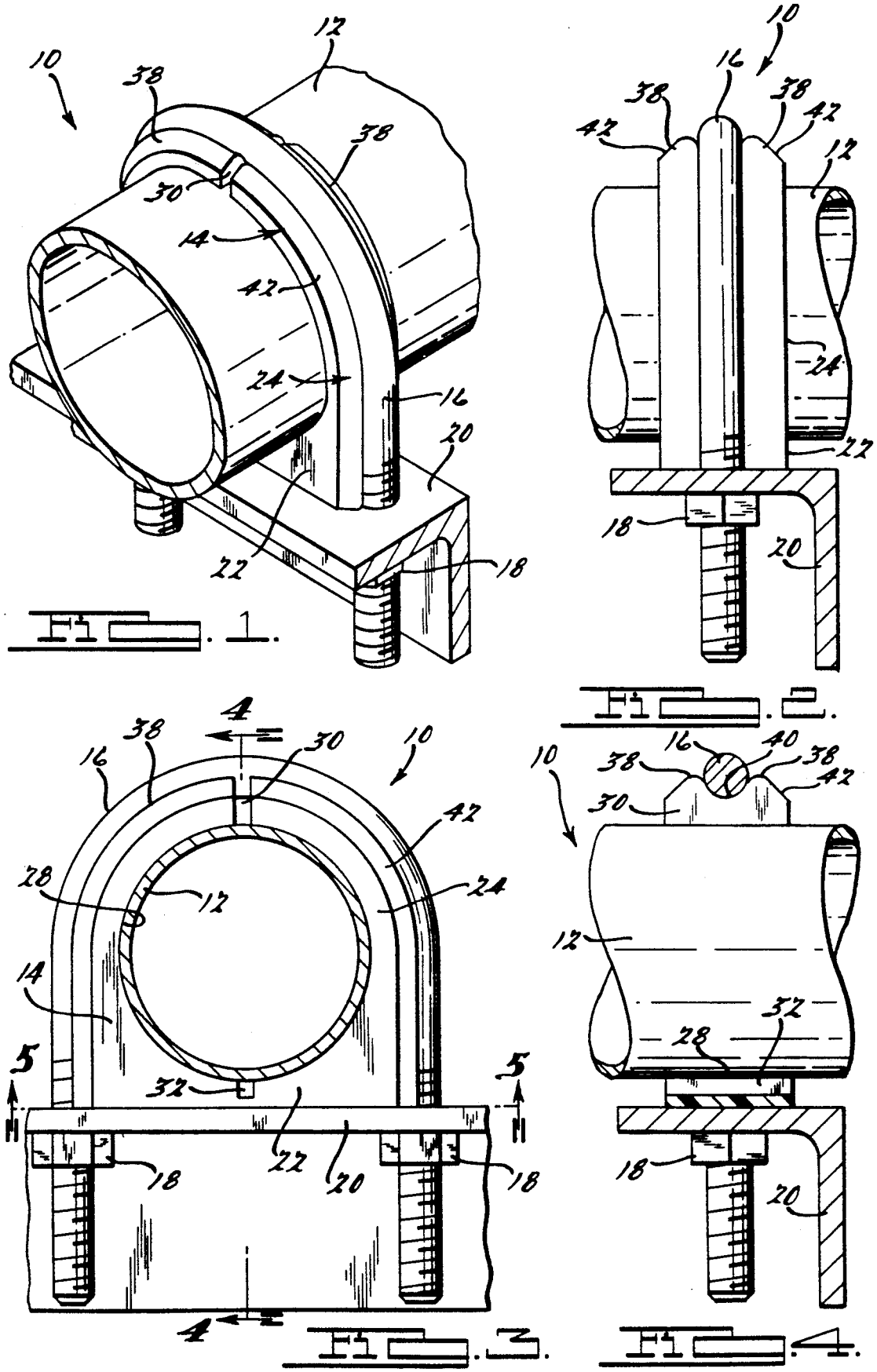

1

CLAMP ASSEMBLY

BACKGROUND OF THE INVENTION

1. Field of the Invention

The present invention relates generally to a clamp assembly for securing elongated cylindrical members such as pipe, conduit, tubing or hose to a support surface, and more particularly, to a U-bolt clamp assembly with a cushion for securing such an elongated cylindrical member therein.

2. Description of Related Art

Presently, there exists a clamp assembly having two clamp halves, and a stud non-rotatably anchored on one of the clamp halves. The stud includes an integral or separable spacer portion which controls the clamping force exerted on the cylindrical member and prevents deformation of the cylindrical member when the stud assembly is tightened.

An example of such a clamp assembly is disclosed in U.S. Pat. No. 4,516,296, issued May 14, 1985, by Inventor Clarence A. Sherman, which is hereby incorporated by reference. THe patented clamp assembly includes an elastomeric cushion insert for indirectly engaging the cylindrical member through the cushion insert which partially encircles the cylindrical member and is retained within the clamp assembly. The cushion insert of the '296 patent includes a generally planar base portion with upwardly and inwardly extending arcuate side walls that substantially encompass the cylindrical member. The ends of the side walls form a gap. The side walls form a smooth continuous passageway extending axially through the cushion insert in which the cylindrical member is disposed. The side walls also include end flanges extending outwardly at the ends of the cushion insert to limit the relative axial movement between a clamp half disposed between the end flanges and the cushion insert.

One disadvantage of the above-referenced clamp assembly is that the assembly requires specially designed and manufactured components such as the clamp halves which therefore increases the cost of the assembly. Another disadvantage of such clamp assembly is that in certain situations a large amount of force must be exerted by the operator on the cushion insert to spread the side walls sufficiently apart to fit over and about the cylindrical member. A solution to this latter disadvantage is disclosed in Applicant's co-pending application Ser. No. 287,007, filed Dec. 20, 1988, which is also hereby incorporated by reference. The clamp assembly of that application includes a means for increasing the ability of the cushion to flex to be disposed on and about the cylindrical member. One such means disclosed is in the form of a slot or living hinge incorporated in the passageway of the cushion insert. Also disclosed in that application is a means for preventing rotation of the cylindrical or other member within the clamp assembly.

A further disadvantage with prior known clamp assemblies of the type discussed is that for very large sizes of cylindrical members the cushion insert becomes exceedingly expensive.

It is, therefore, one object of the present invention to provide an economical clamp assembly that comprises an easy-to-use cushion insert to fit over cylindrical members, and an off-the-shelf means for clamping the cushion insert and cylindrical member to a support surface.

It is another object of the present invention to provide a clamp assembly which can be used for tubing, pipes and other cylindrical members of all sizes.

It is a further object of the present invention to provide a cushion that will transmit the clamping force of a U-shaped rod member across the entire width of the cushion surface that is in engagement with the cylindrical member.

It is a still further object of the present invention to provide an economic clamp assembly that can be used on pipes, tubing or cylindrical members up to twenty-four inches in diameter.

It is another object of the present invention to provide a cushion strip of a uniform cross section that can be cut to the appropriate length for a variety of cylindrical member sizes.

SUMMARY OF THE INVENTION

Accordingly, the present invention is a clamp assembly comprising a cushion insert disposed within clamp means to secure a tube, pipe or other cylindrical member to a support surface. The clamp means can be a standard U-bolt fastener. The cushion insert includes a spaced pair of raised portions that define an arcuate saddle or recess therebetween for receiving the clamp means and preventing relative axial movement of the clamp means and cushion insert. The saddle also distributes the clamping force from the clamp means to the entire width of the cushion insert surface that engages the cylindrical member. The cushion insert includes means for allowing the cushion insert to readily flex and be disposed on and about the cylindrical member.

As an alternate embodiment the cushion has a uniform cross section so that it can be extruded in roll form and cut to any desired length to accommodate a variety of cylindrical member sizes.

One advantage of the present invention is that an economical clamp assembly is provided that utilizes as its clamp means a standard off-the-shelf U-shaped bolt fastener. The clamp assembly therefore does not require a channel to be attached to a support surface. Another advantage of the present invention is that the clamping force load exerted by the U-bolt through a knife or line edge contact is distributed across the full width of the cushion thereby achieving the same clamping effect as conventional and more expensive strap type clamps. A further advantage of the present invention is that the cushion insert is more flexible to readily allow it to be disposed on and about the cylindrical member without disassembling the member. A further advantage is that the cushion may also be provided in strip form to accommodate a variety of sizes of cylindrical members. A still further advantage of the present invention is that U-bolts allow large cylindrical members carrying liquid or other fluids of substantial weight to be secured with a low cost, economical and efficient clamping system that prevents metal to metal contact, suppresses noise and acts as a shock and vibration dampener.

Other advantages of the present invention will be readily appreciated as the same becomes better understood by reference to the following detailed description in view of the accompanying drawings.

BRIEF DESCRIPTION OF THE DRAWINGS

FIG. 1 is a perspective view of a clamp assembly according to the principles of the present invention.

FIG. 2 is a side elevational view of the clamp assembly of FIG. 1.

FIG. 3 is a front elevational view of the clamp assembly of FIG. 1.

FIG. 4 is a sectional view of the tubing clamp of FIG. 3 taken along line 4—4.

DESCRIPTION OF THE PREFERRED EMBODIMENT

Figure 5:
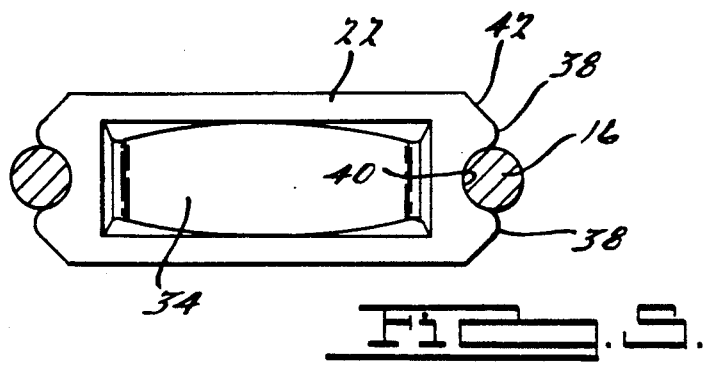
FIG. 5 is a sectional view of the tubing clamp of FIG. 3 taken along line 5—5.

Referring to FIG. 1, a clamp assembly 10 constructed in accordance with the principles of the present invention for securing an elongate cylindrical member 12 is shown. The clamp assembly 10 comprises a cushion insert 14 and a U-shaped rod or bolt member 16. Fastening means 18 are provided for securing the clamp assembly 10 to a support surface 20.

As illustrated in FIGS. 1-4, the cushion insert 14 comprises a generally planar base portion 22 with upwardly and inwardly extending arcuate side walls 24. Side walls 24 and base portion 22 define a passageway 28 that extends axially through the cushion insert 14. The size and shape of passageway 28 is determined by the size and shape of the elongate cylindrical member 12 that is to be secured by clamp assembly 10. At the top of the passageway 28 across from the base portion 22 is an axial space or gap 30 that separates the sidewalls 24 into two substantially equal portions and allows them to flex. Located substantially directly across passageway 28 from gap 30 is a slot or groove 32 in the base portion 22 of cushion insert 14. The slot 32 is formed axially along the entirety of base portion 22. Gap 30 and slot 32 cooperate to permit base portion 22 and sidewalls 24 to be more readily spread apart and over the elongate cylindrical member. Further details of this concept of a "living hinge", which makes installation of the cushion insert 14 on the elongate member 12 faster and easier, are set forth in co-pending application Ser. No. 287,007, the disclosure and teaching of which are hereby incorporated by reference. That application also teaches how cushion insert 14 can be internally shaped or configured to receive a fitting or other elongate member of nonconstant diameter so as to prevent rotation of the fitting or other member even when wrench force is applied.

Figure 6:
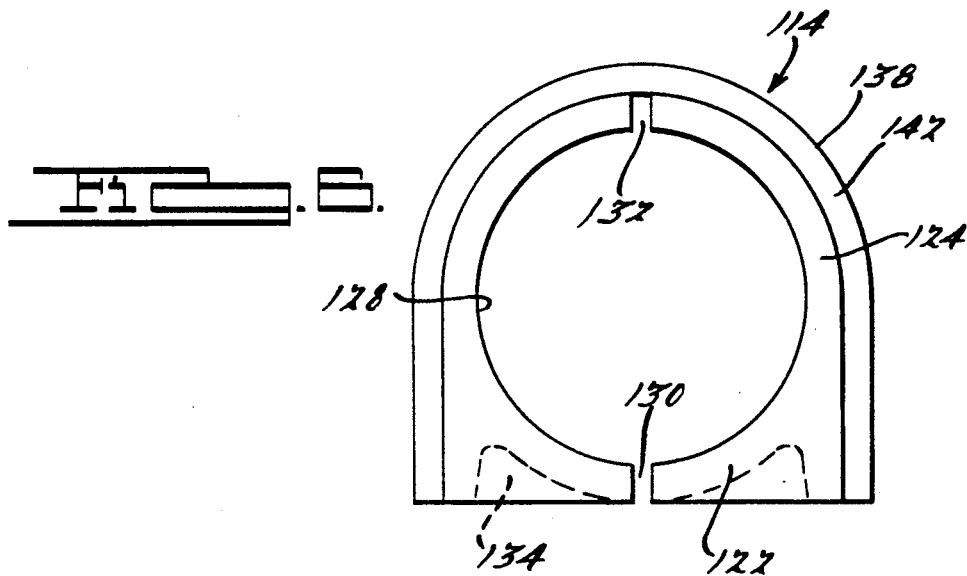
FIG. 6 is a front elevational view of an alternate embodiment of the cushion insert.

Referring to FIG. 6 an alternate embodiment 114 of the cushion insert 14 is shown. Like parts have like numerals increased by one hundred. The cushion insert 114 has a smooth continuous passageway 128 with a gap 130 separating the base portion 122 into two substantially equal portions. Located substantially directly across passageway 128 from gap 130 is a slot 132 extending axially into the sidewalls 124 along the top of passageway 128. In this embodiment the "living hinge" is reversed from that in cushion insert 14. In cushion insert 114 the base portion 122 is spread apart as sidewalls 124 rotate about slot 132 during assembly of cushion insert 114 over the cylindrical member.

As shown in FIG. 5, the base portion 22 may have cushion insert material removed axially interior of its ends to form a recess or pocket 34 which adds to the flexibility of the juncture where the side walls 24 and the base portion 22 meet. In FIG. 6 the recess 134 is shown in phantom. The cushion insert 14 may be made of an elastomeric material such as a thermoplastic elastomer. This material allows the cushion insert 14 to be molded by conventional injection molding.

Referring to FIG. 1 through 6, the sidewalls 24 and the base portion 22 of cushion insert 14 have raised exterior portions 38 that form a saddle 40 therebetween for receiving the bolt member 16 when the clamp assembly 10 is assembled. The saddle 40 is configured in arcuate fashion corresponding to the diameter of the bolt member 16. The saddle 40 transmits the clamping force of the bolt member 16 through the cushion insert 14 substantially across the entire lineal width of passageway 28 to the cylindrical member 12. In this manner the knife or line edge clamping force that the bolt member 16 would transmit to the cylindrical member if no cushion insert 14 were utilized, is transmitted across a substantially wider circumferential section of the cylindrical member 12. The load distribution of the clamp assembly 10 is therefore significantly improved through incorporation of the cushion insert 14 of the present invention. The raised exterior portions 38 of the sidewalls 24 and the base portion 22 also serve to prevent lateral movement of cushion insert 14 relative to the bolt member 16 along the cylindrical member 12. It is desirable to keep the cushion insert 14 centered under the bolt member 16 to insure even load distribution of the clamping force.

U-shaped bolt member 16 in the preferred embodiment is a conventional U-bolt that is used for a variety of fastening operations. Accordingly, the cost of clamp assembly 10 as compared to other clamp assemblies is reduced because a specially designed and manufactured clamp or fastener is not required. U-bolts are available in standard S.A.E. specification sizes having predetermined lengths, widths and bolt diameters. For example, a three inch U-bolt has a spread of approximately three inches, is approximately five inches long, and has a bolt diameter of approximately ⅜ of an inch. The cushion insert 14 that is designed to secure a conventional 2 inch pipe (which has an outside diameter of approximately 2⅜ inches) has a passageway 28 diameter of approximately 2⅜ inches and a passageway 28 axial length of approximately 1¼ inches. The height from base portion 22 to the bottom of saddle 40 is approximately 2.9 inches thereby leaving approximately one quarter inch of cushion material between the U-bolt and the pipe and between the pipe and the support surface. Raised portions 38 that form saddle 40 extend radially outward from the bottom of saddle 40 an amount that is substantially equivalent to the radius of the U-bolt, approximately 3/16 of an inch. As shown in FIG. 4, raised portions 38 have outside edges 42 which are angled approximately 45 degrees relative to the longitudinal axis of the cushion insert 14. A small radius is provided at the radially outermost point of the raised portions 38 to facilitate the injection molding manufacturing process. For the specific cushion insert 14 example discussed, this radius is approximately 0.1 inch.

The axial length of passageway 28 is proportional to the thickness of the cushion insert material between the U-bolt 16 and cylindrical member 12 which is in turn proportional to the bolt radius of the U-bolt. For U-bolts having different bolt diameters than the example highlighted above, each of these parameters will be proportionately increased or decreased accordingly.

Figure 7:
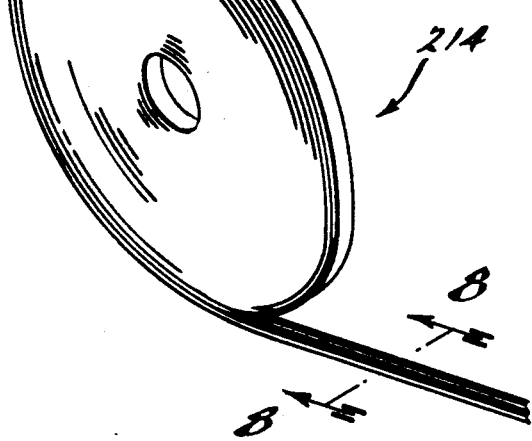
FIG. 7 is a perspective view of a second alternate cushion insert in strip form according to the principles of the present invention.
Figure 8:
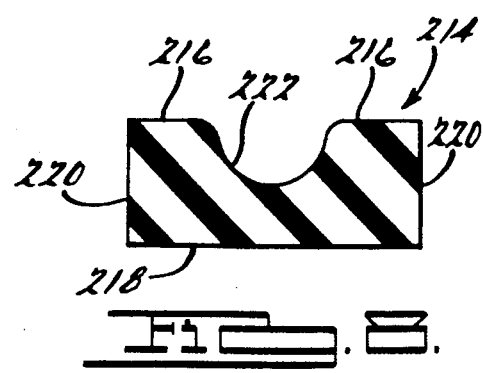
FIG. 8 is a sectional view of the cushion insert of FIG. 7 taken along line 8—8.

Referring to FIGS. 7 and 8, a second alternative embodiment 214 of the cushion insert 14 is shown. The solid core cross-section of the cushion strip 214 shown in FIG. 8 permits the cushion strip to be extruded in roll form as illustrated in FIG. 7. Cushion strip 214 may be manufactured from the same elastomeric material as the cushion insert 14. Cushion strip 214 is substantially rectangular in cross-section with an outer wall 216 and an inner wall 218. Between the outer and inner walls 216 and 218 at each end of the cushion strip 214 is a peripheral wall 220. Outer wall 216 includes a recess 222 that has a circular configuration substantially corresponding to the cross-section of U-shaped bolt member 16.

In practice the cushion strip 214 is utilized by determining the circumference of the elongate cylindrical member 12 to be secured by the clamp assembly 10 and cutting a length of cushion strip 214 from the roll that corresponds to such circumference. The cushion strip 214 is wrapped around member 12 with inner wall 218 contacting cylindrical member 12. A bolt member 16 is placed over cushion strip 214 so that bolt member 16 rests in recess 222. Bolt member 16 is then fastened to a support surface 20 to secure cushion strip 214 and cylindrical member 12. The outerwall 216 of the cushion strip 214 is substantial planar because it contacts the support surface 20 at the point at which the cylindrical member 12 and the support surface 20 are closest together. In the preferred method of installing the cushion strip 214, the free ends of the cushion strip are butted at the point along the cylindrical member's circumference furthest away from the support surface 20 so that the ends of the cushion strip 214 remain clamped between the cylindrical member 12 and the bolt member 16. It will be appreciated that direct contact between bolt member 16, cushion strip 214, and cylindrical member 12, or between support surface 20, cushion strip 214, and cylindrical member 12, due to the clamping force of bolt member 16 and support surface 20, occurs only at the 180 circumferential degrees of cylindrical member 12 that is furthest away from support surface 20, as well as at the point on the cylindrical member's circumference closest to the support surface 20.

The cushion strip 214 is useful when encountering situations that require the securing and clamping of increasing large diameter pipe and the like, such that injection molding the cushion insert 14 in such large sizes and spreading it to fit over the pipe becomes impractical. Examples of large diameter pipe that are secured to a support surface and have insulation requirements are steam pipes, oil derrick pipes, fluid handling pipes on ships, commercial buildings, and the like. These pipes or cylindrical members frequently are provided in sizes up to twenty four inches in diameter, and larger. The cushion strip 214 can be cut to fit any large size pipe as long as the same diameter bolt member 16 is used. For different diameter bolt members 16 that may be used, the proportional physical dimensions of the cushion strip 214 are altered accordingly, much like the cushion insert 14.

The present invention has been described in an illustrative manner. It is to be understood that the terminology which has been used is intended to be in the nature of words of description rather than of limitation.

Obviously, many modifications or variations of the present invention are possible in light of the above teachings. Therefore within the scope of the appended claims, the present invention may be practiced otherwise than as specifically described.

What is claimed is:

1. A clamp assembly for securing a cylindrical member, comprising:
    a U-shaped rod member for attaching said clamp assembly to a support surface;
    fastening means for retaining said rod member to said support surface; and
    a cushion insert having a base portion and side walls that extend upwardly and inwardly to define a substantially circular passageway, said side walls having an outer surface comprising a saddle having a pair of raised portions forming an arcuate recess for retainably engaging said U-shaped rod member, such that said rod member exerts a substantially evenly distributed clamping force along the entire periphery of said insert, and an inner surface for engagement with said cylindrical member to absorb vibration and shock, means for allowing increased flexure of said side walls of said cushion insert to fit over and about said cylindrical member, said flexure means comprising a slot extending partially radially through and axially along the bottom of the inner surface of said cushion insert, and said cushion insert substantially surrounding said cylindrical member to prohibit contact of said U-shaped rod member with said cylindrical member.

2. A clamp assembly as set forth in claim 1 wherein said U-shaped rod member is a U-bolt and said fastening means comprises a pair of nuts to operatively cooperate with said U-bolt.

3. A clamp assembly as set forth in claim 1 wherein said side walls separate said passageway into substantially equal halves and come together to form a gap opposite said base portion.

4. A cushion insert adapted to be disposed about a cylindrical member, comprising:
    a planar base portion adapted to be supported by a support surface;
    a pair of upwardly and inwardly arcuate side walls at each end of said base portion;
    said side walls having ends which are spaced from each other to form a gap;
    said side walls having a radially outer surface that includes a spaced pair of circumferentially raised portions and an arcuate saddle therebetween;
    said side walls forming a passageway extending axially through said cushion insert;
    means forming a slot in said base portion opposite said gap to allow flexure of said side walls about said cylindrical member, and said cushion insert adapted to substantially surround said cylindrical member to prohibit contact of a U-shaped bolt member adapted to secure said cushion about said cylindrical member to said support surface.

5. A cushion insert as set forth in claim 4 wherein said passageway has an arcuate bottom, said slot extending partially through and axially along said arcuate bottom.

6. A cushion insert adapted to be disposed about a cylindrical member, comprising:
    a planar base portion adapted to be supported by a support surface;
    a pair of upwardly and inwardly arcuate side walls at each end of said base portion;
    said side walls and base portion forming an arcuate passageway extending axially through said cushion insert;
    said arcuate passageway having a gap that runs radially and axially through said cushion insert, and means forming a slot radially opposite said gap to allow flexure of said side walls about said cylindrical member; and said side walls having a radially outer surface that includes a spaced pair of circumferentially raised portions and an arcuate recess therebetween, and said cushion insert adapted to substantially surround said cylindrical member to prohibit contact of a U-shaped bolt member adapted to secure said cushion about said cylindrical member to said support surface.

7. A cushion insert as set forth in claim 6 wherein said recess is adapted to receive said U-shaped bolt member for securing said cushion insert and said cylindrical member to said support surface.

8. A cushion insert as set forth in claim 6 wherein said gap is centered and extends axially along said planar base portion.

9. A cushion insert as set forth in claim 6 wherein said slot is centered and extends axially along the portion of said passageway formed by said planar base portion.

10. A cushion insert as set forth in claim 6 wherein said raised portions have inclined outer walls.

11. A cushion insert as set forth in claim 10 wherein said inclined walls are at an angle of approximately forty five degrees to a horizontal axis that extends axially along said arcuate passageway of said cushion insert.

12. A cushion insert as set forth in either of claims 4 or 8 wherein said base portion includes a recess for further allowing for flexure of said side walls.

* * * * *